United States Patent Office 3,072,647
Patented Jan. 8, 1963

3,072,647
PROCESS FOR THE MANUFACTURE OF 17α-HYDROXY-ALDOSTERONE AND ESTERS THEREOF
Albert Wettstein, Riehen, and Karl Heusler and Peter Wieland, Basel, Switzerland, assignors to Ciba Corporation, New York, N.Y., a corporation of Delaware
No Drawing. Filed Apr. 9, 1962, Ser. No. 185,841
Claims priority, application Switzerland Apr. 14, 1961
3 Claims. (Cl. 260—239.55)

The present invention provides a new process for the manufacture of the known 17α-hydroxy-aldosterone which is of special value by virtue of its close chemical relationship to aldosterone and hydrocortisone.

A process for the manufacture of this compound is already known, according to which a 21-oxygenated $\Delta^{5:17(20)}$ - 3 - ethylenedioxy - 11β:18 - oxido - 18 - tetrahydropyranyloxy-20-acyloxy-pregnadiene, more especially the 21-al or a 21-acid ester, is reacted in a hydroxyl-free solvent with a complex metal hydride, more especially lithium aluminum hydride, then a hydroxylating metal oxide, for example osmium tetroxide, is added on to the 17:20-double bond of the complex formed and finally the adduct is hydrolyzed.

Such process forms the subject of copending application Serial No. 46,373, filed by Wettstein et al., August 1, 1960, of which the present application is a continuation in part.

The process of the present invention is a further development of the aforementioned known process, by which the corresponding 11:18-lactones may be used as starting material. Surprisingly, it has been observed that when an 11:18-lactone is treated with a complex metal hydride, the reduction of a 21-oxo function and the formation of a 20-enolate salt is accompanied by reduction of the 18:11β-lactone grouping to the hemiacetal grouping and that the resulting metal complex—in which the metal (probably the aluminum) is now bound to three oxygen functions, namely in position 18:20 and 21—is sufficiently stable and soluble to enable it to be treated with osmium tetroxide as is done in the known process.

Thus, according to the new process the 18:11β-lactone of $\Delta^5$-3-ethylenedioxy-11β:21-dihydroxy-20-oxopregnene-18-acid is oxidised in known manner to the 21-aldehyde; the 20:21-di-oxo compound is acylated to form a $\Delta^{17}$-20-enol acylate; the resulting product is reacted with lithium aluminum hydride, and the complex formed is treated with about one molecular equivalent of osmium tetroxide, then hydrolysed, acylated, the 3-ketal group is split and, if desired, the 21-acyloxy group is hydrolysed.

The 21-aldehydes can be prepared from the 21-hydroxy compounds, for example by oxidation with cupric acetate, or by conversion into a quaternary 21-ammonium salt, for example pyridinium tosylate, and condensation with para-nitroso-dimethylaniline to form the nitrone which is then split up. In order to obtain the $\Delta^{17}$-20-enol acylates the 20,21-dioxo-compounds are then treated with an acylating agent. The acylation is performed e.g. with an aliphatic carboxylic acid anhydride, for example with the mixed anhydride of formic and acetic acid or with acetic anhydride, propionic anhydride or the like in the presence of pyridine; by this treatment the 21-oxo group is simultaneously partially converted into a 21,21-diacyloxy group. Both the 21-oxo- and the 21:21-diacyloxy-$\Delta^{17}$-20-enol acylates may be used for the reduction with lithium aluminum hydride. During this treatment three reactions take place simultaneously, namely: the 21-oxo group is reduced to the 21-hydroxyl group, the enol ester group in 20 position is split, and the 18:11-lactone is reduced to the 18:11-hemiacetal. It is surprising that in the complex formed neither the 20-ketone nor the 18-oxo group are further reduced.

When the complex prepared in a hydroxyl-free medium, for example in ether, tetrahydrofuran, dioxane, glycol dimethyl ether or a mixture of these solvents, is hydroxylated with about one molecular proportion of osmium tetroxide, this oxidant is added on to the 17:20-enol double bond and after decomposition of the complex and ketal cleavage the 17α-hydroxy-aldosterone is obtained. It is of advantage to acylate the product after the hydrolytic decomposition of the complex and before proceeding to the ketal cleavage. This acylation is carried out with an anhydride or halide of a carboxylic acid, for example with acetic anhydride, and yields after ketal cleavage with an acid the 21-monoacylates and, or 18:21-diacylates of 17α-hydroxy-aldosterone.

The 18:21-diacylates are readily hydrolysed to 21-mono-acylates, for example on recrystallisation from an aqueous solvent, more especially in the presence of acetic acid. Said 21-monoacylates can be hydrolysed to the free 17α-hydroxy-aldosterone in known manner, for example in aqueous methanol with an alkali metal bicarbonate, or by heating with an alkali metal acylate, for example potassium or sodium acetate, in anhydrous methanol.

17α-hydroxy-aldosterone displays aldosterone action and can therefore be used as a medicament.

For administration in human or veterinary medicine, there are manufactured by known methods preparations containing the aforementioned 17-hydroxy-aldosterone in conjunction with solid or liquid excipients, for example in conjunction with organic or inorganic pharmaceutical excipients suitable for parenteral, enteral or local administration. Suitable excipients are substances that do not react with the active substance, such for example, as water, vegetable oils, benzyl alcohols, polyethylene glycols, gelatine, lactose, starch, magnesium stearate, talc, white petroleum jelly, cholesterol or other known medicinal excipients. More especially, preparations are made for parenteral administration, preferably solutions, in the first place oily or aqueous solutions, also suspensions, emulsions, or depot preparations; for enteral administration there are formulated in a similar manner also tablets or dragees, and for local administration also ointments or creams. The preparations may be sterilized and/or may contain assistants such as preserving, stabilising, wetting or emulsifying agents, salts for regulating the osmotic pressure, or buffers. These preparations contain preferably from 0.05 mg. to 100 mg. of the active principle per unit dose such as an ampoule or tablet, or from about 0.005% to 70%.

The following examples illustrate the invention.

*Example 1*

A solution of 1.4 grams of potassium bicarbonate in 28 cc. of water is mixed with 75 cc. of ice-cold methanol and then with 930 mg. of the 18:11-lactone of 3-ethylene-dioxy-11β-hydroxy-20-oxo-21-acetoxy-$\Delta^5$-pregnenoic - 18-acid while rinsing with 37 cc. of methanol. The mixture is stirred for 12 hours at room temperature, treated with 1 cc. of glacial acetic acid and evaporated almost to dryness in a water-jet vacuum, then treated with water and extracted three times with methylene chloride. The organic solutions are washed with water, dried and evaporated in a water-jet vacuum; when the residue is recrystallised from methylene chloride+ether with addition of 150 mg. of carboraffin, it yields 745 mg. of the 18:11-lactone of 3-ethylene-dioxy-11β:21-di-hydroxy - 20 - oxo-$\Delta^5$-pregnenoic-18-acid melting at 216.5–223.5° C. Optical rotation $[\alpha]_D^{26} = +7.5° \pm 2°$ (c.=0.961 in chloroform). Infra-red spectrum (in methylene chloride): 2.87μ (hydroxyl), 5.67μ (γ-lactone); 5.68μ (20-ketone) and 9.07μ (ketal).

A suspension of 690 mg. of the above ketal in 14 cc.

of methanol, having a temperature of 60° C., is treated with a hot solution of 1.05 grams of cupric acetate in 14 cc. of methanol of 80% strength and 0.0276 cc. of glacial acetic acid, and the mixture is stirred for 20 minutes at 60° C., then cooled, suction-filtered and the filter residue is rinsed with methylene chloride. The clear, blue filtrate is treated with 138 mg. of Complexon III, washed twice with water, dried and evaporated in a water-jet vacuum. The resulting crude 18:11-lactone of 3-ethylenedioxy-11β-hydroxy-20:21-dioxo-$\Delta^5$-pregnenoic-18-acid is heated for 2½ hours at 60° C. with a mixture of 6.5 cc. of pyridine, 6.5 cc. of acetic anhydride and 6.5 cc. glacial acetic acid. The reaction mixture is then cooled, poured into 120 cc. of ice water and extracted three times with methylene chloride. The organic solutions are washed successively with 60 cc. of cold 2 N-hydrochloric acid, water, 60 cc. of semi-saturated sodium bicarbonate solution and water. The organic solutions are dried and evaporated in a water-jet vacuum and the residue is dissolved in xylene; the solution is again evaporated in a water-jet vacuum and this operation is repeated once with benzene. The product is then chromatographed on 35 grams of silica gel containing 15% of water. The crystalline fractions eluted with a 9:1-mixture of benzene and ethyl acetate are recrystallised from a mixture of methylene chloride and ether and yield 290 mg. of the 18:11-lactone of 3-ethylenedioxy-11β-hydroxy-20-acetoxy-21-oxo-$\Delta^{5:17(20)}$-pregnadienoic-18-acid as a mixture of its stereoisomers.

1.4 cc. of an 0.945-molar solution of lithium aluminum hydride in tetrahydrofuran is stirred into a solution of 290 mg. of the enol acetate obtained above in 10 cc. of absolute tetrahydrofuran under nitrogen and while cooling with ice. After having stirred the mixture for 1½ hours with ice-cooling it is mixed with 0.4 cc. of cyclohexanone, 4 hours later with 130 mg. of osmium tetroxide and after a further 45 minutes the ice bath is removed. The reaction mixture is stirred for 15 hours at room temperature and then kept for another 48 hours at room temperature, then rinsed with 46 cc. of methanol with stirring into a solution of 1.85 grams of ammonium sulphite in 46 cc. of water and 0.1 cc. of glacial acetic acid. The mixture is stirred for one hour at room temperature, filtered through Celit and rinsed with 250 cc. of methanol. The filtrate is evaporated to about 30 cc. at a bath temperature of 50° C. in a water-jet vacuum and extracted three times with methylene chloride. The methylene chloride extracts are washed with water, dried and evaporated in a water-jet vacuum, and the residue is heated under nitrogen for 2 hours at 50° C. with a mixture of 2 cc. of acetic anhydride and 2 cc. of pyridine, then evaporated in a water-jet vacuum and dissolved in xylene and again evaporated in a water-jet vacuum, and this operation is repeated once with benzene. The residue is dissolved in 2 cc. of benzene and filtered through 2.1 grams of silica gel containing 15% of water and rinsed with 20 cc. of benzene, 50 cc. of a 9:1-mixture of benzene and ethyl acetate and 50 cc. of a 4:1-mixture of benzene and ethyl acetate. The combined filtrates are evaporated in a water-jet vacuum, dissolved in 9 cc. of glacial acetic acid, placed for 3 minutes in a bath maintained at 100° C., treated with 1 cc. of water, and left in said bath for another 8 minutes, and then evaporated in a water-jet vacuum. The residue is dissolved in benzene, again evaporated in a water-jet vacuum, and this operation is repeated once more. The resulting light-brown oil is chromatographed on 90 sheets of paper in the system formamide/benzene-chloroform (1:1), whereby two zones are obtained which absorb in ultra-violet light and give a positive blue tetrazolium reaction and of which the upper zone migrates the same distance as d:l-17α-hydroxy-aldosterone acetate, while the lower zone displays the $R_f$-value of aldosterone acetate. The upper zone is cut out, disintegrated and pasted with 300 cc. of tetrahydrofuran of 20% strength, then suctioned off, the filter residue is once more pasted with 250 cc. of tetrahydrofuran of 20% strength, and again suctioned off, and this operation is repeated twice with 250 cc. of tetrahydrofuran of 20% strength and three times with 100 cc. of 100% tetrahydrofuran. The combined filtrates are concentrated to 1 liter in a water-jet vacuum at a bath temperature of 40° C. and extracted three times with methylene chloride, then washed twice with water and the methylene chloride extracts are dried and evaporated at 40° C. in a water-jet vacuum. After having been dried at 40° C. in a high vacuum, the residue yields 54 mg. of a yellow oil interspersed with crystals. When this product is recrystallised from a mixture of acetone, methylene chloride and ether with the use of 10 mg. of carboraffin, it yields 16 mg. of 17α-hydroxy-aldosterone acetate melting at 205.5 to 208.0° C. Its infra-red spectrum in chloroform is identical with that of d:l-17α-hydroxy-aldosterone acetate.

85 mg. of 17α-hydroxy-aldosterone acetate are mixed with a solution of 60 mg. of potassium acetate in 12.5 cc. of methanol. The whole is boiled for 6 hours under nitrogen, then cooled, treated with dilute sodium chloride solution and extracted three times with a 7:3-mixture of chloroform and alcohol. The organic solutions are washed once with dilute sodium chloride solution, dried and evaporated in a water jet vacuum. The residue is chromatographed on 30 sheets of paper in the system formamide-chloroform, whereby three zones are obtained which give a positive blue tetrazolium reaction and absorb in the ultra-violet region; their $R_f$-values are 0.05, 0.12 and 0.17 respectively. The zone of $R_f$-value 0.17 is cut out, disintegrated and pasted with 70 cc. of tetrahydrofuran of 20% strength, then filtered, the suction-filter residue is once more pasted with 70 cc. of tetrahydrofuran of 20% strength and again filtered, and this operation is repeated once with 70 cc. of 20% tetrahydrofuran, once with 70 cc. of 50% tetrahydrofuran and with 3 x 70 cc. of 100% tetrahydrofuran. The combined filtrates are concentrated to 170 cc. at a bath temperature of 40° C. in a water-jet vacuum, treated with 34 grams of sodium chloride and extracted three times with a 7:3-mixture of chloroform and alcohol. The organic solutions are washed once with semi-saturated sodium chloride solution, dried and evaporated in a water-jet vacuum. The residue is mixed with methanol and 30 mg. of carboraffin, heated for a short time at 50 to 55° C. and then filtered through a glass sinter suction filter. The filter residue is repeatedly treated with methanol of 50% strength and then suctioned off again. When the combined filtrates are evaporated, they yield 68 mg. of a substantially colorless oil interspersed with crystals. On recrystallization from a mixture of methylene chloride, methanol and ether it yields 15 mg. of 17α-hydroxy-aldosterone melting at 208.5 to 209.5° C. When the crude product is treated with pyridine+acetic anhydride and heated for 8 minutes at 100° C. with acetic acid of 90% strength, it yields again 17α-hydroxy-aldosterone acetate.

*Example 2*

Pharmaceutical preparations in the form of ampoules containing an oily injection solution can be prepared in the following manner:

17α-hydroxy-aldosterone _____ mg__ 1
Neutral sesame oil free from peroxide to make up cc__ 1

10 mg. 17α-hydroxy-aldosterone are dissolved in 5 cc. of pure acetone, the acetone is then evaporated, the residue is dissolved by heating for two hours in purified sesame oil and the volume of the solution is made up to 10 cc. The solution is then filtered through a sterilised glass sinter suction filter having large pores, charged into 10 1 cc. ampoules and the latter are then sterilised in conventional manner.

What is claimed is:
1. Process for the manufacture of 17-hydroxy-aldo- sterone 21-esters wherein the 18:11-lactone of $\Delta^5$-3-ethylenedioxy - 11β-hydroxy-20,21-dioxo-pregnenoic-18-acid is acylated to form a $\Delta^{17}$-20-enol-acylate, the resulting product is reacted with lithium aluminum hydride, the complex formed is treated with about one molecular equivalent of osmium tetroxide, then hydrolysed, acylated and the 3-ketal group is split.

2. Process for the manufacture of 17-hydroxyl-aldosterone according to claim 1, wherein the 21-acylate obtained is hydrolysed by means of an alkaline agent.

3. Process as claimed in claim 1, wherein the $\Delta^{17}$-20-enol-acylate of the 18:11-lactone of the 3-ethylenedioxy-11β-hydroxy-20,21-dioxo-$\Delta^5$-pregnenoic-18-acid is treated with lithium aluminum hydride and the complex so obtained is treated with 1–1.5 mol equivalents of osmium tetroxide.

No references cited.